(12) United States Patent
D'Arcy et al.

(10) Patent No.: US 9,373,092 B2
(45) Date of Patent: Jun. 21, 2016

(54) SYSTEM AND METHOD FOR AUTOMATED DISTRIBUTION OF SUPERVISORY FUNCTIONS IN A CONTACT CENTER

(71) Applicant: Avaya Inc., Basking Ridge, NJ (US)

(72) Inventors: Paul D'Arcy, Limerick (IE); Neil O'Connor, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 176 days.

(21) Appl. No.: 13/786,817

(22) Filed: Mar. 6, 2013

(65) Prior Publication Data

US 2014/0258501 A1 Sep. 11, 2014

(51) Int. Cl.
*G06F 15/16* (2006.01)
*G06Q 10/00* (2012.01)
*H04L 12/24* (2006.01)
*H04M 3/523* (2006.01)
*G06Q 10/06* (2012.01)

(52) U.S. Cl.
CPC ............... *G06Q 10/00* (2013.01); *G06Q 10/06* (2013.01); *G06Q 10/06311* (2013.01); *H04L 12/24* (2013.01); *H04M 3/5233* (2013.01); *H04L 41/5061* (2013.01)

(58) Field of Classification Search
CPC .............................. H04L 12/24; H04L 12/26
USPC ........................................... 709/224; 718/104
See application file for complete search history.

(56) References Cited

U.S. PATENT DOCUMENTS

2009/0119673 A1* 5/2009 Bubba ........................... 718/104

* cited by examiner

*Primary Examiner* — Adnan Mirza
(74) *Attorney, Agent, or Firm* — Stevens & Showalter LLP

(57) ABSTRACT

A system for automated distribution of supervisory functions in an enterprise is provided. The system includes a monitor module configured to monitor performance of resources in the enterprise. The system further includes a skill finder module configured to find at least one skilled resource for at least one type of work request. The system further includes an assignment module configured to assign the at least one skilled resource a subset of supervisory role for the at least one type of work request.

15 Claims, 3 Drawing Sheets

SYSTEM AND METHOD FOR AUTOMATED DISTRIBUTION OF SUPERVISORY FUNCTIONS IN A CONTACT CENTER

BACKGROUND

1. Field of the Invention

Embodiments of the present invention generally relate to a system and method for allocating supervisory roles in an enterprise and particularly to a system and method for automated distribution of supervisory functions in the enterprise.

2. Description of Related Art

In a traditional contact center environment, the role of a supervisor is assigned to a specifically identified individual by a manager of the contact center. The manager usually assigns the role of the supervisor to the specifically identified individual who has completed a sufficient period of employment in the contact center, has performed well, and has also shown some leadership traits during his/her employment. The role of the supervisor is to manage agents in his/her team (usually 8-15 agents), improve agent's performance to bring out best in them, improve satisfaction of customers contacting the contact center, and improve service level agreements of the contact center. The supervisor is further assigned credentials that offer access to additional functions such as supervisor RTDs, reports, observe functions, and ability to perform agent configuration changes such as skill set and agent re-assignments. The supervisor is also responsible for activities such as maintaining service levels, running reports, coaching agents, etc.

However, ad-hoc and crowd-sourced styles of customer service provisioning are becoming more prevalent during these days. Hence, the role of the supervisor becomes more difficult to define by the manager in the contact center. Further, traditional approach of assigning the supervisor is becoming more difficult to manage, as it is relatively static in nature. For example, some supervisors might be highly competent at maintaining service level, but only average at training due to interpersonal characteristics. Hence, it is very difficult to find someone who may be highly competent in doing all of the responsibilities of the supervisor.

There is thus a need for a system and method for managing the allocation of a supervisor's role and responsibilities, and further to provide an adaptive and user friendly environment, in which both customer and contact center can achieve their respective objectives simultaneously.

SUMMARY

Embodiments in accordance with the present invention provide a system for automated distribution of supervisory functions in an enterprise. The system includes a monitor module configured to monitor performance of resources in the enterprise. The system further includes a skill finder module configured to find at least one skilled resource for at least one type of work request. The system further includes an assignment module configured to assign the at least one skilled resource a subset of supervisory role for the at least one type of work request.

Embodiments in accordance with the present invention further provide a computer-implemented method for automated distribution of supervisory functions in an enterprise. The computer-implemented method includes monitoring performance of resources in the enterprise, finding at least one skilled resource for at least one type of work request coming to the enterprise, and assigning the at least one skilled resource a subset of supervisory role for the at least one type of work request.

Embodiments in accordance with the present invention further provide a computer readable medium storing computer readable instructions when executed by a processor perform a method that includes monitoring performance of resources in the enterprise, finding at least one skilled resource for at least one type of work request coming to the enterprise, and assigning the at least one skilled resource a subset of supervisory role for the at least one type of work request.

The present invention can provide a number of advantages depending on a particular configuration. First, Embodiments of the present invention provide an adaptive mechanism that uses strategic Avaya Aura® contact center architecture to intelligently assign diffuse functions normally associated with a designated supervisor to suitable participants in a pool of resources available. Avaya Aura® is a core communications platform supporting unified communications and contact center solutions for enterprises. It enables SIP-based session management. Although Avaya Aura® is used in this application, it should understood by one of ordinary skill in the art that any communications platform or for that matter contact center platform that supports unified communications and contact center solutions is contemplated by the present invention and that the Avaya Aura® is used by way of example only and for simplicity of explaining embodiments of the present invention.

Next, embodiments of the present invention disaggregate various roles of a supervisor, and assigns them to individuals who have demonstrated a specific competency. Embodiments of the present invention take care of the fact that some supervisors might be highly competent at one role (e.g., maintaining service level), but only average at another role (e.g., training) due to interpersonal characteristics. Embodiments of the present invention view the resources of a contact center in a generic fashion, not making a specific differentiation between agents and supervisors.

Further, embodiments of the present invention provide disaggregates and disperse the various roles of the supervisor in a controlled and measured manner. Embodiments of the present invention automatically allocate to each resource a subset of a supervisor role that is ideally suited to him/her. Hence, the present invention substantially removes the static nature of conventional supervisor role and selection, and rather than assigning a single person all the responsibilities of the supervisor, embodiments of the present invention automatically assign to a plurality of skilled resources various responsibilities of the supervisor that is ideally suited to each of them.

Further, embodiments of the present invention can remove and/or re-assign certain supervisory features to other persons in the pool of resources, based on their performance on the allocated subset of the supervisor role. This helps both the customer and enterprise to achieve their respective objectives simultaneously by working in an adaptive and user friendly environment.

Furthermore, the present invention is applicable in any enterprise in addition to traditional contact center. Any enterprise that requires managing and allocating supervisor role may use embodiments of the present invention to disaggregate various roles of the supervisor, and assign them to individuals who have demonstrated a specific competency.

These and other advantages will be apparent from the disclosure of the present invention contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
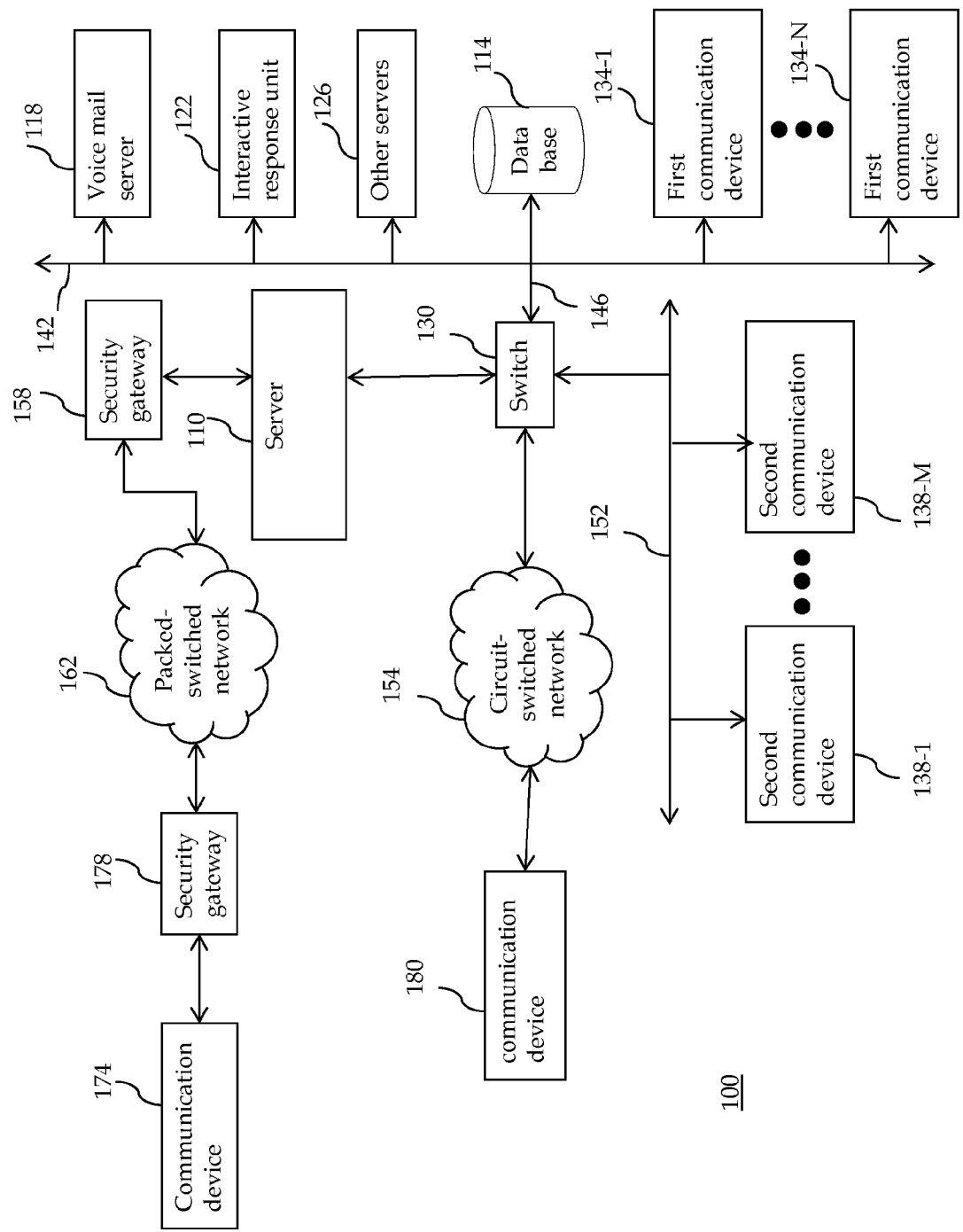
FIG. 1 is a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The present invention will be illustrated below in conjunction with an exemplary communication system, e.g., the Avaya Aura® system. Although well suited for use with, e.g., a system having an ACD or other similar contact processing switch, the present invention is not limited to any particular type of communication system switch or configuration of system elements. Those skilled in the art will recognize the disclosed techniques may be used in any communication application in which it is desirable to provide improved contact processing.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Although this embodiment is discussed with reference to a client-server architecture, it is to be understood that the principles of the present invention apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

Figure 2:
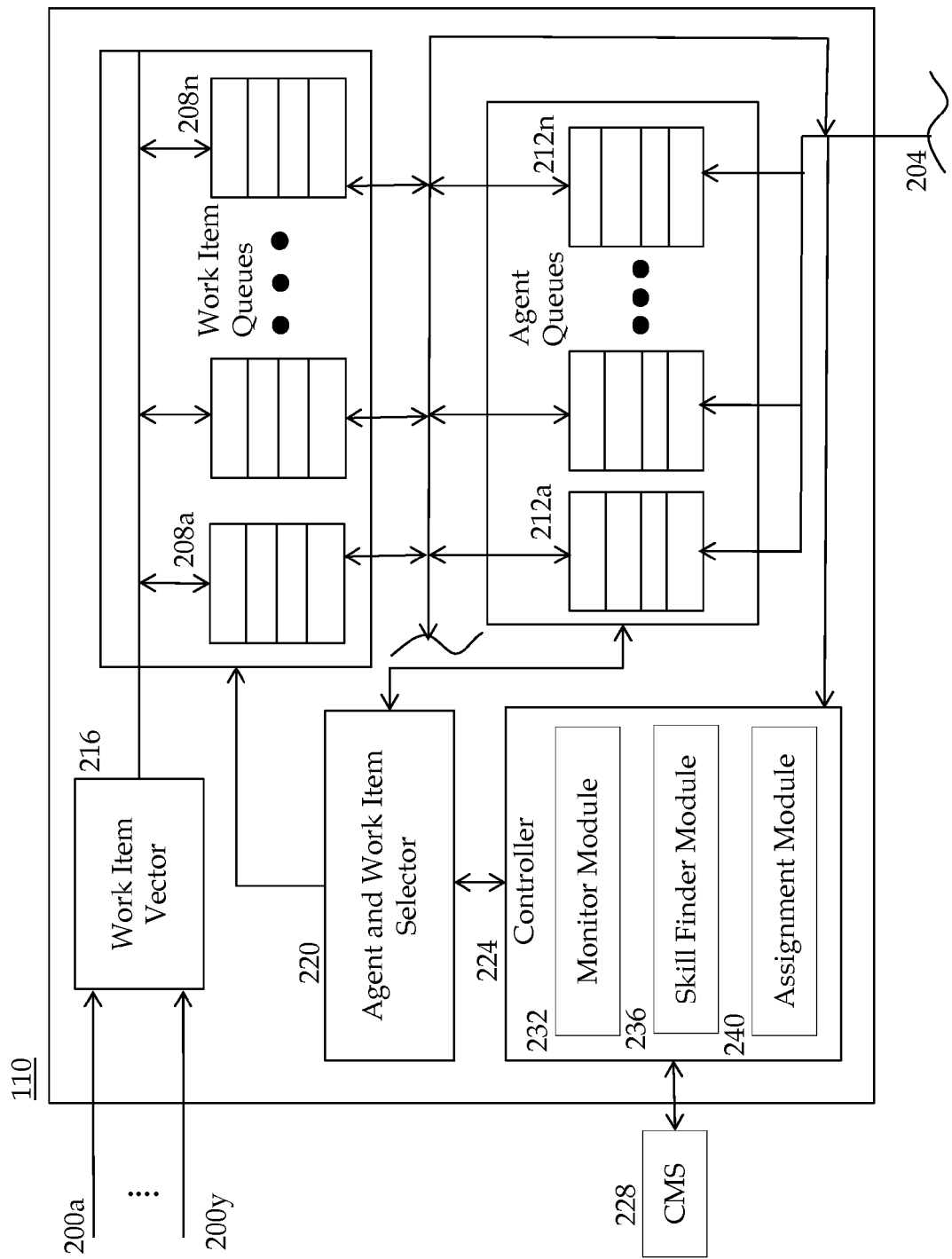
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include Avaya Inc.'s Operational Analyst™ with On-Line Analytical Processing or OLAP technology or a Call Management System or CMS 228 that gathers contact records and contact-center statistics for use in generating contact-center reports. OA and CMS will hereinafter be referred to jointly as CMS 228.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company.

Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As can be seen in FIG. 2, included among the data stored in the server 110 is a set of work item queues 208a-n and a separate set of agent queues 212a-n. Each work item queue 208a-n corresponds to a different set of agent queues, as does each agent queue 212a-n. Conventionally, work items are prioritized and either are enqueued in individual ones of the work item queues 208a-n in their order of priority or are enqueued in different ones of a plurality of work item queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level.

Included among the control programs in the server 110 is a work item vector 216. Contacts incoming to the contact center are assigned by the work item vector 216 to different work item queues 208a-n based upon a number of predetermined criteria, including customer identity, customer needs, contact center needs, current contact center queue lengths, customer value, and the agent skill that is required for the proper handling of the contact. Agents who are available for handling work items are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator, and each of the work item queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M corresponds to one of a set of internal extensions Ext1, . . . ExtM, respectively. The second communication devices can include, for example, wired and wireless telephones, PDAs, H.320 videophones and conferencing units, voice messaging and response units, traditional computer telephony adjuncts, and any other communication device.

It should be noted that the present invention does not require any particular type of information transport medium between a switch or server and first and second communication devices, i.e., the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In one configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming work item by the communications component (e.g., switch 130, fax server, email server, web server, and/or other server) receiving the incoming work item. The incoming work item is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent.

The server 110 distributes and connects these work items to telecommunication devices of available agents based on the predetermined criteria noted above. When the central server 110 forwards a voice contact (or first work item) to an agent, the central server 110 also forwards customer-related information from databases 114 to the agent's computer work station for viewing (such as by a pop-up display) to permit the agent to better serve the customer. Depending on the contact center configuration, the central server may forward a list of work items to an available agent to preview before forwarding the work item itself and the data associated therewith to the agent. The agents process the work items or contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to an embodiment of the present invention, included among the programs executing on the server 110 are an agent and work item selector 220 and a controller 224. The selector 220 and the controller 224 are stored either in the main memory or in a peripheral memory (e.g., disk, CD ROM, etc.) or some other computer-readable medium of the contact center 100. The selector 220 and the controller 224 collectively effect an assignment between available work items (or contacts) and available agents in a way that tends to maximize contact center efficiency for the current contact center state. The selector 220 uses predefined criteria in selecting an appropriate agent to service the work item. The controller 224 assists the work item vector 216 in routing the contacts to the appropriate queue 208 and/or the selector 220 in routing a contact to a most desirable agent in the queue 212. The controller 224, in particular, obtains, for each of a plurality of contact center goals or objectives, status information, or information respecting whether or not a corresponding goal (for example, the service level agreement) is being met or unmet and/or a level to which the corresponding goal is being met or unmet.

For example, exemplary goal levels can be expressed as actual, average or median wait times in each queue 208, actual, average, or median agent staffing levels in each queue 212, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

The agent and customer profiles are typically maintained and updated by a profile generator (not shown). Upon the completion of handling a work item, the generator collects selected metrics for the work item. These metrics include the skill involved in servicing the work item, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the work item, the rating of the customer of the agent's proficiency in handling the work item, the rating of another party, such as the agent's supervisor or another observer, of how the work item was serviced, whether the agent requested assistance, and whether the agent's training was completed, and stores the information in the database 114, such as CMS 228. The metrics over a selected period of time are typically stored under each agent's profile. Each agent profile typically includes metrics associated with a plurality of work items serviced by the agent for each agent skill, and each customer profile includes metrics associated with a plurality of contacts by the customer.

The controller 224 has access to various performance measures of each of the resource and contact handling history of the resources in the system. The controller 224 is also configured to use various systems, known in the art, to assess the performance of individual resources in processing work items. The controller 224 is further configured to find area of competency for each of the resource based on their performance measures and contact handling history. The controller 224 is further configured to utilize such findings in maximizing contact center efficiency.

In an embodiment of the present invention, the controller 224 may assign an individual resource a subset of supervisor role in an area of competency of the individual resource. The controller 224 may monitor performance of the resource in the subset of supervisor work, and may assign another subset of supervisory role to the resource, if measured service level of the contact center is improving. Otherwise, the controller 224 may remove the subset of supervisor role from the resource, and assign another suitable resource same subset of supervisor role.

Figure 3:
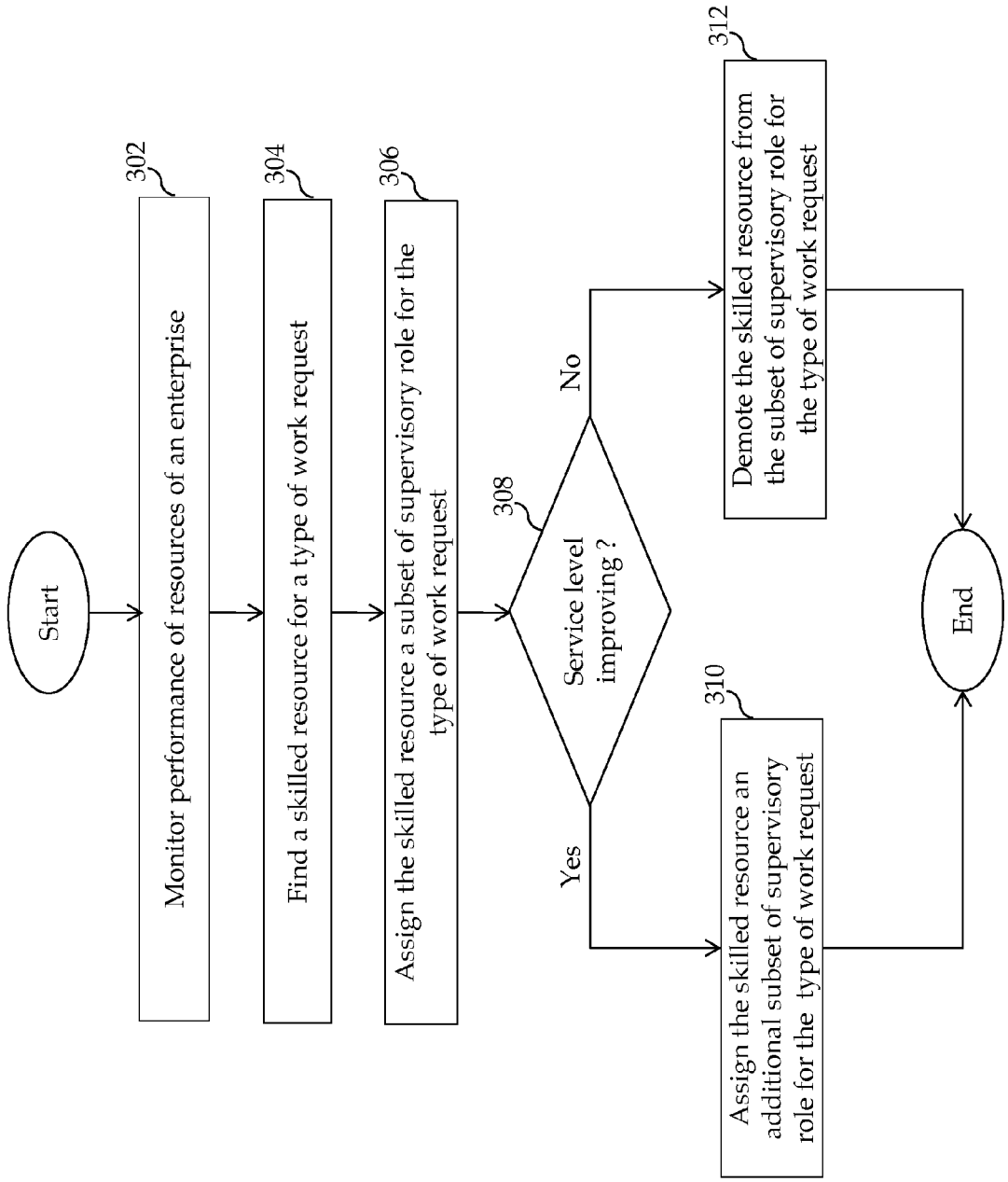
FIG. 3 is a flowchart depicting an embodiment of the present invention.

According to an embodiment of the present invention, the controller 224 includes a monitor module 232, a skill finder module 236, and an assignment module 240. The operation of the monitor module 232, the skill finder module 236, and the assignment module 240 will now be discussed with reference to FIG. 3.

In step 302, the monitor module 232 monitors performances of resources of the enterprise. In an embodiment, the monitor module 232 monitors interaction of the resources of the enterprises with customers, customer feedback, reports of the enterprise, and other data stored in the CMS 228. In an embodiment, the enterprise is a contact center. Further, the resources include human resources and non-human resources. The human resources include agents and supervisors etc.

In step 304, the skill finder module 236 finds a skilled resource for a type of work request. In an embodiment, the skill finder module 236 may divide the incoming work items into a plurality of type of work items based on their nature of origin (e.g., location), required skill, type of communication associated with the work request (e.g., an email, a phone call, etc.), required time to complete the work request, required language, etc.

For example, a particular resource may be very good with sales and French speaking. Another particular resource may be very good with technical knowledge of a particular product and English speaking. Further, a particular resource may be very capable at dealing with very quick calls, while another particular resource may be more capable of having a long conversation.

In step 306, the assignment module 240 assigns a subset of supervisory role to the skilled resource for the type of work request. In an embodiment, the subset of supervisory role may include additional responsibility for the skilled resource in incoming same type of work requests, wherein the resource is very skilled and competent. Further, the skilled resource may also be provided additional credentials and authority for completing the subset of supervisory role.

In an embodiment, a supervisor role includes a scale of supervisory functions and associated credentials (or authority). At first level, the skilled resource may have facility (or authority) for viewing backlog for a particular set of calls or a particular subject type. Further, the skilled resource, at this level may also handle more calls.

In an embodiment of the present invention, a subset of supervisor role, assigned to the skilled resource, may include maintaining service levels of the enterprise for the at least one type of work request. The skilled resource may also be given abilities to view service levels of the enterprise for the at least one type of work request. The skilled resource may also influence routing of work requests belonging to the at least one type of work request.

According to an embodiment of the present invention, the assignment module 240 is configured to automatically promote the skilled resource for the sub-set of supervisory role for the type of work request, wherein the skilled resource is very competent and experienced. In another embodiment of the present invention, the assignment module 240 is configured to first offer the skilled resource the supervisory role for the type of work request, and the skilled resource is given freedom to accept or decline the offer. The assignment module 240 may also offer incentive to the at least one skilled resource for accepting the supervisory role. The incentives may include monetary or other award incentives to promote good resources for taking up subset of supervisor's work and responsibility.

For example, if a particular resource demonstrates a competency in a particular type of work request (e.g., French e-mails complaining about furniture assembly instructions), then a subset of supervisor role may be automatically offered to that particular resource for same type of future work requests. Further, the resource may be provided with authority and facility for meeting the requirement of supervisory role. For example, the resource may be offered the ability to view service level of all negative sentiment furniture e-mails originating from a particular area (e.g., Quebec), and additionally some limited ability to influence routing of such contacts or work request to suitable agents.

According to the present invention, the controller 224 disaggregates various roles of a supervisor, and assigns them to individual resources who have demonstrated a specific competency. For example, some supervisors might be highly competent at one role (e.g., maintaining service level), but only average at another role (e.g., training) due to interpersonal characteristics. The controller 224 automatically allocates each resource a subset of a supervisor role that is ideally suited to him/her.

In step 308, the controller 224 determines whether the service level of the contact center 100 is improving for the type of work requests, for which the skilled resource has been assigned a subset of supervisory role. If the measured service is improving, the assignment module 240, at step 310, may assign the skilled resource an additional subset of supervisory role for the same type of work request. In an embodiment of the present invention, the controller 224 monitors performance of the skilled resource for a predetermined time (e.g., 'x' amount of time, a week, a month, a quarter etc.). If performance of the resource is above a threshold, assignment module 240 may assign an additional subset of supervisory role for the same type of work request to the resource. For example, additional responsibilities like ability to observe and/or approving responses being sent to originators of work items.

If performance of the resource for additional role (i.e., subset of supervisory role) is below a threshold, the measured service level of the contact center for the type of work request may go below accepted levels. In step 312, the assignment module 240 demotes the skilled resource from the subset of supervisory role for the type of work request. In an embodiment, the work assignment module 240 is configured to automatically demote the at least one skilled resource based on the performance of the skilled resource during a predetermined time (e.g., 'x' amount of time, a week, a month, a quarter, etc.). According to an embodiment of the present invention, a resource may automatically lose a level of the supervisory role, as well as gain a level of the supervisory role based on his/her dynamic performance. The controller 224 dynamically monitors performances of the resources and dynamically promotes or demotes the resources from the subset of supervisors roles based on their performances.

For example, if the controller module 224 finds that a particular agent is starting to trend downwards (e.g., an agent/ supervisor whose training level is going downward), the particular agent is demoted from the training responsibilities if level of the training goes below a certain threshold.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for automated distribution of supervisory functions in a contact center, the system comprising:
    a processor coupled to a memory, where the processor executes program code stored in the memory to:
        monitor performance of resources in the contact center;
        find a profile of a skilled resource for a type of work request, wherein the skilled resource comprises a human agent associated with the profile;
        assign to the profile of the skilled resource a subset of a supervisory role for the type of work request, wherein the subset of the supervisory role comprises:
            credentials to access service levels for the type of work request; and
            an ability to influence routing of work requests belonging to the type of work request;
        monitor a service level of the contact center for the type of work request; and
        remove the assigned subset of the supervisory role from the profile of the skilled resource if the service level of the contact center for the type of work request falls below a threshold.

2. The system of claim 1, wherein the processor executes the program code to monitor interaction of the resources of the enterprises with customers, customer feedback, and reports of the enterprise.

3. The system of claim 1, wherein the subset of supervisory role comprising maintaining service levels of the enterprise for the type of work request.

4. The system of claim 1, wherein abilities of the supervisor comprising viewing service levels of the enterprise for the type of work request and influencing routing of work requests belonging to the type of work request.

5. The system of claim 1, wherein the processor executes the program code to automatically promote the skilled resource for the supervisory role for the type of work request.

6. The system of claim 1, wherein the processor executes the program code to offer the skilled resource the supervisory role for the type of work request.

7. The system of claim 6, wherein the processor executes the program code to offer incentive to the skilled resource for accepting the supervisory role.

8. The system of claim 1, wherein the processor executes the program code to assign additional subset of supervisory role for the type of work request based on the performance of the skilled resource during a predetermined time.

9. The system of claim 1, wherein the type of work request comprising French Emails complaining about furniture assembly instructions.

10. A computer-implemented method for automated distribution of supervisory functions in a contact center, the method comprising:
    monitoring performance of resources in the contact center;
    finding a profile of a skilled resource for a type of work request coming to the enterprise, wherein the skilled resource comprises a human agent associated with the profile;
    assigning to the profile of the skilled resource a subset of a supervisory role for the type of work request, wherein the subset of the supervisory role comprises:
        credentials to access service levels for the type of work request; and
        an ability to influence routing of work requests belonging to the type of work request;
    monitoring a service level of the contact center for the type of work request; and
    removing the assigned subset of the supervisory role from the profile of the skilled resource if the service level of the contact center for the type of work request falls below a threshold.

11. The computer-implemented method of claim 10, wherein the monitoring comprises monitoring interaction of the resources of the contact center with customers, customer feedback, reports of the enterprise.

12. The computer-implemented method of claim 10, wherein the subset of supervisor role further comprises maintaining service levels of the enterprise for the type of work request.

13. The computer-implemented method of claim 10, further comprising automatically promoting the skilled resource for the supervisory role for the type of work request.

14. The computer-implemented method of claim 10, further comprising assigning an additional subset of supervisory role for the type of work request based on the performance of the skilled resource during a predetermined time.

15. A non-transitory computer readable medium storing computer readable instructions when executed by a processor perform a method comprising:
    monitoring performance of resources in a contact center;
    finding a profile of a skilled resource for a type of work request coming to the enterprise, wherein the skilled resource comprises a human agent associated with the profile;
    assigning to the profile of the skilled resource a subset of a supervisory role for the type of work request, wherein the subset of the supervisory role comprises:
        credentials to access service levels for the type of work request; and
        an ability to influence routing of work requests belonging to the type of work request;
    monitoring a service level of the contact center for the type of work request; and
    removing the assigned subset of the supervisory role from the profile of the skilled resource if the service level of the contact center for the type of work request falls below a threshold.

* * * * *